(12) United States Patent  
Bohl et al.

(10) Patent No.: US 9,086,329 B2
(45) Date of Patent: Jul. 21, 2015

(54) SENSOR ARRANGEMENT AND METHOD FOR PRODUCTION

(75) Inventors: Benjamin Bohl, Berlin (DE); Oliver Bard, Falkensee (DE)

(73) Assignee: EPCOS AG (DE)

( * ) Notice: Subject to any disclaimer, the term of this patent is extended or adjusted under 35 U.S.C. 154(b) by 215 days.

(21) Appl. No.: 13/255,323

(22) PCT Filed: Mar. 24, 2010

(86) PCT No.: PCT/EP2010/053843
§ 371 (c)(1),
(2), (4) Date: Nov. 3, 2011

(87) PCT Pub. No.: WO2010/108961
PCT Pub. Date: Sep. 30, 2010

(65) Prior Publication Data
US 2012/0057617 A1 Mar. 8, 2012

(30) Foreign Application Priority Data
Mar. 27, 2009 (DE) .......... 10 2009 015 315

(51) Int. Cl.
*G01K 1/00* (2006.01)
*G01K 1/08* (2006.01)
*G01D 11/24* (2006.01)

(52) U.S. Cl.
CPC .............. *G01K 1/08* (2013.01); *G01D 11/245* (2013.01)

(58) Field of Classification Search
CPC ................. G01K 1/08; G01D 11/245
USPC .......... 374/208, 431, 163, 100, 161, 130; 356/43
See application file for complete search history.

(56) References Cited

U.S. PATENT DOCUMENTS

| 3,441,893 | A | 4/1969 | Gordon et al. |
| 5,254,807 | A | 10/1993 | Pfander et al. |
| 5,367,282 | A * | 11/1994 | Clem .......................... 338/22 R |
| 5,722,772 | A | 3/1998 | Keil et al. |
| 5,789,920 | A | 8/1998 | Gass |
| 7,293,479 | B2 | 11/2007 | Sillanpaa et al. |
| 2002/0125417 | A1* | 9/2002 | Damaschke .................. 250/239 |
| 2004/0247015 | A1* | 12/2004 | Wojan et al. .................. 374/120 |
| 2006/0167139 | A1* | 7/2006 | Nelson et al. ................. 523/212 |
| 2007/0110124 | A1 | 5/2007 | Shiraki et al. |
| 2008/0107151 | A1* | 5/2008 | Khadkikar et al. ........... 374/141 |

FOREIGN PATENT DOCUMENTS

| CN | 101135591 A | 3/2008 |
| DE | 39 30 702 A1 | 3/1991 |
| DE | 197 00 862 A1 | 7/1997 |
| DE | 10 2008 022 465 A1 | 11/2008 |
| EP | 0 580 323 A2 | 1/1994 |
| EP | 1 065 485 A1 | 1/2001 |
| JP | 4-298002 | 10/1992 |

(Continued)

*Primary Examiner* — Lisa Caputo
*Assistant Examiner* — Janice M Soto
(74) *Attorney, Agent, or Firm* — DLA Piper LLP (US)

(57) ABSTRACT

A sensor arrangement has at least one sensor element with electrical connections. At least one sensor element is arranged in a solid plastic-material body, at least a first insulating layer, which encloses the sensor element, being arranged between the sensor element and the plastic-material body. The sensor element senses at least one physical property of a medium to be measured.

19 Claims, 2 Drawing Sheets

(56) References Cited

FOREIGN PATENT DOCUMENTS

| JP | 8-50062 A | 2/1996 |
| JP | 8-94452 | 4/1996 |
| JP | 11144913 * | 5/1999 |
| JP | 2005-17088 | 1/2005 |
| JP | 2007-266309 | 10/2007 |
| WO | 2005/106403 A2 | 11/2005 |
| WO | 2008/138312 A2 | 11/2008 |

* cited by examiner

SENSOR ARRANGEMENT AND METHOD FOR PRODUCTION

RELATED APPLICATIONS

This is a §371 of International Application No. PCT/EP2010/053843, with an international filing date of Mar. 24, 2010 (WO 2010/108961, published Sep. 30, 2010), which is based on German Patent Application No. 10 2009 015 315.2, filed Mar. 27, 2009, the subject matter of which is incorporated by reference.

BACKGROUND

DE 102008022465 A1 discloses a sensor arrangement which has a protective enclosure to protect a sensor element. It could nonetheless be helpful to provide a sensor arrangement that has sufficient electrical protection, while the response time of the sensor element is restricted only a little by the protection.

SUMMARY

We provide a sensor arrangement including at least one sensor element with electrical connections, the at least one sensor element being arranged in a solid plastic-material body, wherein at least a first insulating layer, which embeds the sensor element, is arranged between the sensor element and the plastic-material body.

We also provide a method for producing the sensor arrangement, wherein a plastic-material body is provided which has a hollow space in which at least one sensor element is positioned.

Figure 1:
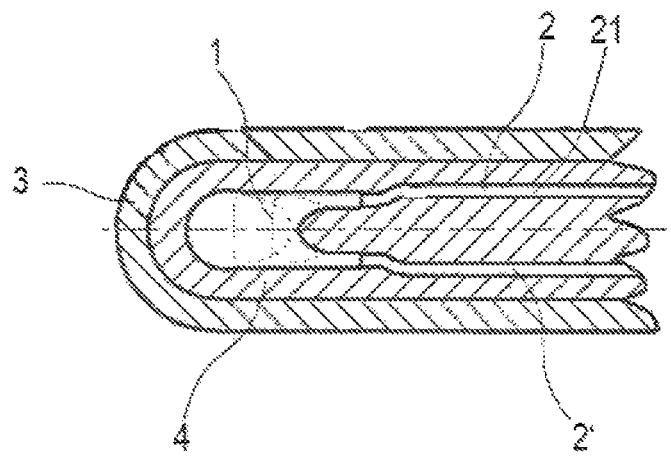
FIG. 1 shows the schematic structure of a first example of a sensor arrangement.

LIST OF REFERENCE SIGNS 1, 11 sensor element
2, 2' electrical connection
3, 13 plastic-material body
4, 14, 24 first insulating layer
5 further insulating layer
6 optoelectronic component
7 hollow space in the plastic-material body 3
8 carrier
12 conductor track
21 partition

DETAILED DESCRIPTION

We provide a sensor arrangement which has at least one sensor element. The sensor element has electrical connections, by which the sensor element is electrically contacted. The sensor element is arranged in a solid plastic-material body. A solid plastic-material body should be understood as meaning a body made of a flexible plastic that has a defined basic form. The plastic-material body can be at least partially deformed, while the plastic-material body reverts again to its original form at any time. The electrical connections preferably extend beyond the dimensions of the plastic-material body.

Arranged between the sensor element and the plastic-material body is at least one insulating layer which embeds the sensor element. At least a partition of the electrical connections adjacent the sensor element is surrounded by the first insulating layer. The first insulating layer extends from the sensor element to the adjacent partitions of the electrical connections. Preferably, at least the region of the electrical connections is surrounded by the first insulating layer which is located in the interior space of the plastic-material body.

In one example, the sensor element directly senses at least one physical parameter of the medium to be measured. The sensor element is formed, for example, as a temperature sensor or as an optical sensor. In the case of a temperature sensor, for example, the temperature of the surrounding medium is sensed. In the case of an optical sensor, for example, optical signals acting on the sensor arrangement are sensed.

In one example of the sensor arrangement, a further insulating layer is arranged between the first insulating layer and the plastic-material body.

The plastic-material body preferably has a form which comprises at least one hollow space open to one side. However, the form of the plastic-material body is not restricted to such forms, but may have any form desired.

The material of the plastic-material body and the materials of the first insulating layer and the further insulating layers are preferably independent from one another. The materials are preferably made to meet their respective requirements and also have a high voltage endurance. In the case of a temperature sensor, the materials preferably have a high thermal conductivity. In the case of an optical sensor, the materials preferably have neutral optical properties with respect to the wavelength range sensed by the optical sensor. The materials are preferably as transparent as possible to the radiation in the wavelength range of the optical sensor.

The first insulating layer and the further insulating layer preferably comprise a flexible or solid polymer.

In an example of the sensor arrangement with a number of sensor elements, the individual sensor elements are respectively surrounded by the first insulating layer. In a further example, the sensor elements have a common first insulating layer, which surrounds all or some of the sensor elements.

In one example, the connections of the sensor element are configured as rigid supply leads. The supply leads preferably comprise a wire or a stranded conductor which remains in a certain alignment, the supply leads being configured such that they fix the sensor element at a specific position in the plastic-material body of the sensor arrangement.

In a further example, the sensor element has flexible supply leads or electrical connections.

In a further example, at least one sensor element is arranged on a rigid carrier or a printed circuit board, which is positioned in the plastic-material body.

In one example of the sensor arrangement, the plastic-material body has at least one guiding device suitable to position the sensor element at a defined location in the interior space of the plastic-material body. The guiding device is preferably arranged or formed such that between the sensor element and the guiding device of the plastic-material body, there is at least sufficient space for the first insulating layer surrounding the sensor element. The guiding device is formed, for example, as a web or projection.

In one example of the sensor arrangement, at least one sensor element has the function of a temperature sensor. Known temperature sensors are, for example, electrical components with NTC (Negative Temperature Coefficient) or PTC (Positive Temperature Coefficient) properties.

In a further example of the sensor arrangement, at least one sensor element has the function of an optical sensor.

In one example of the sensor arrangement, at least one sensor element is configured as a temperature sensor and a further sensor is formed as an optical sensor. Suitable, for example, as optical sensors are photodiodes or phototransistors.

In an example of the sensor arrangement with a temperature sensor and an optical sensor, it is possible for the temperature and optical signals to be sensed as simultaneously as possible.

In a further example, the sensor arrangement comprises an optoelectronic component. The optoelectronic component preferably has the properties of a light-emitting diode such as, for example, an LED or OLED.

In one example, the sensor arrangement comprises at least one optical sensor and at least one optoelectronic component arranged such that together they have, for example, the function of a light barrier.

In one example, the plastic-material body has a wall thickness of at least 1 mm at least in the region of the sensor element. The wall thickness of the plastic-material body in the region of the electrical supply leads of the sensor arrangement may be both less than and greater than the wall thickness in the region of the sensor element. Preferably, the plastic-material body has a wall thickness of at least 1 mm at least in the region in which the sensor arrangement is in contact with the medium to be measured.

In one example of the sensor arrangement, the sensor arrangement has a voltage endurance of at least 3000 V AC (alternating current). The voltage endurance of the sensor arrangement is a result of the sum of the voltage endurances of the individual insulating layers of the arrangement.

In one example of the sensor arrangement, the first insulating layer has a voltage endurance of preferably at least 1000 V AC. Particularly preferably, the first insulating layer has a voltage endurance of 1250 V AC.

The sensor arrangement has a voltage endurance of protection class II as specified by the VDE standard by being constructed such. The protection class is achieved at least in the region of the sensor element and in partitions of the electrical connections adjacent this region. The sensor arrangement is of protection class II at least in the region in which the sensor arrange-ment is in contact with the medium to be measured. Open electrical connections for the further electrical contacting of the sensor arrangement generally do not have voltage endurance to pro-tection class II, but the protective arrangement may, for example, have a plug-in connection that conforms to protection class II. Consequently, for example, the complete sensor arrangement conforms to protection class II. A structure of the sensor arrangement as described above en-sures that the response time of the sensor element is not restricted to any inadmissibly great ex-tent by the insulation, and the sensor arrangement is suitable for rapid sensing of physical proper-ties such as, for example, the temperature or an optical signal acting on the sensor arrangement.

In a method for producing a sensor arrangement as described above, a plastic-material body which has a hollow space is provided. At least one sensor element with electrical connections is positioned in the hollow space of the plastic-material body.

In one example, the sensor element is at a previously fixed distance from the plastic-material body so that the sensor element is arranged at a defined location of the hollow space.

In one example of the method, at least the hollow space in the region of the sensor element is filled with a polymer. The polymer preferably fills the complete space around the sensor element, preferably with no air being present any longer in this region. Partial discharges at interfaces or in hollow spaces are thus avoided.

In a further example, the hollow space of the plastic-material body is filled with a polymer before the positioning of the sensor element. The polymer forms the first insulating layer of the sensor element. The sensor element is subsequently immersed in the polymer-filled hollow space of the plastic-material body up to the desired position.

In a further example of the method, the sensor element is embedded in a first insulating layer before the positioning in the hollow space of the plastic-material body. Suitable for this, for example, is an injection-molding process to encapsulate the sensor element and at least adjacent regions of the electrical connections in a first insulating layer.

In one example of the method, the sensor element enclosed by a first insulating layer and positioned in the hollow space of the plastic-material body is enclosed by a further insulating layer. At least the intermediate space between the first insulating layer of the sensor element and the plastic-material body is preferably filled with a polymer.

The above-described subject-matter and the method are explained in more detail on the basis of the following figures and examples.

The following description reveals that the drawings are schematic and should not be seen as true to scale. Elements that are the same as one another or assume the same function have the same reference signs.

FIG. 1 schematically shows the structure of a first example of the sensor arrangement. The sensor arrangement has a plastic-material body 3. Arranged in the space inside the plastic-material body 3 is a sensor element 1, which as shown, has rigid electrical connections 2, 2'. The sensor element 1 and the partitions 21 of the electrical connections 2, 2' that are shown in FIG. 1 are surrounded by a first insulating layer 4. In FIG. 1, only the relevant partition 21 of the complete sensor arrangement is shown. The ends of the electrical connections 2, 2' can be contacted, preferably from the outside, for contacting of the sensor element 1. The first insulating layer 4 preferably comprises a solid, liquid or flexible polymer. In an example of the first insulating layer 4 that comprises a liquid polymer, the plastic-material body 3 is preferably closed in the end region at least to such extent that the polymer is sealed off, preferably in an airtight manner, in the space inside the plastic-material body 3.

Figure 2:
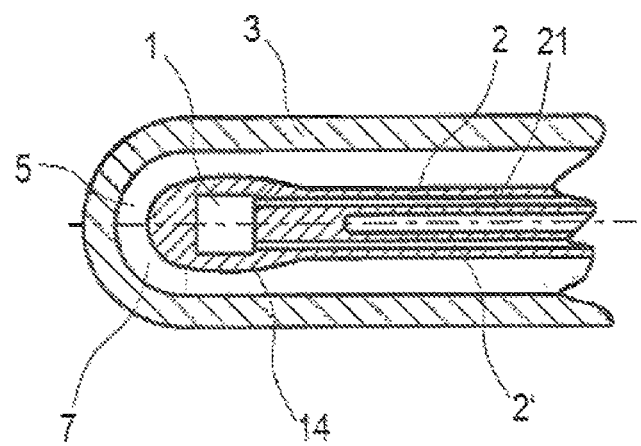
FIG. 2 shows a further example of a sensor arrangement.

In FIG. 2, a schematic structure of a further example of the sensor arrangement is shown. The sensor arrangement comprises a plastic-material body 3 in the hollow space 7 of which a sensor element 1 is arranged. The sensor element 1 has electrical connections 2, 2', the sensor element 1 and the electrical connections 2, 2' being surrounded by a first insulating layer 14, at least in the shown partition 21 of the sensor arrangement. There is an intermediate space between the first insulating layer 14 and the inner wall of the plastic-material body 3 which may form a further insulating layer 5. The further insulating layer 5 may, for example, comprise air or a polymer.

In an example in which the sensor element 1 of the sensor arrangement has the properties of a temperature sensor, the further insulating layer 5 is preferably a polymer which has a good thermal conductivity. In the case of an example in which the sensor element 1 has the properties of an optical sensor, the further insulating layer 5 is preferably an optically transparent gas or polymer.

FIG. 2 shows only the region of the plastic-material body 3 in which the sensor element 1 is arranged. The further region preferably has connections 2, 2' that can be electrically contacted at least from the outside.

Figure 3:
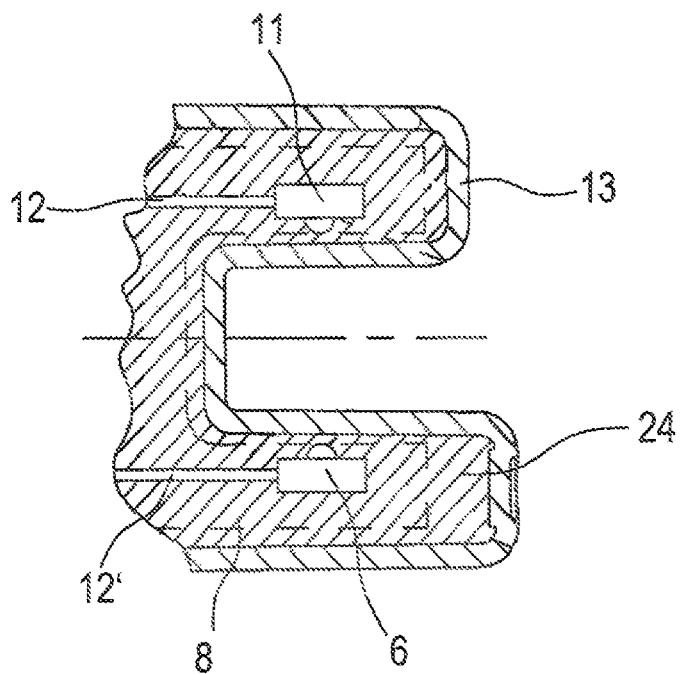
FIG. 3 shows a further example of a sensor arrangement which includes a sensor element and an optoelectronic component.

FIG. 3 schematically shows the structure of a further example of the sensor arrangement that has two components. At least one component is configured as a sensor element 11. A further component is configured as an optoelectronic component 6. The sensor arrangement comprises a plastic-material body 13 in the interior space of which a carrier 8 is arranged. The sensor element 11 and the optoelectronic component 6 are arranged on the carrier 8 with conductor tracks 12, 12'. The sensor element 11 and the optoelectronic component 6 are electrically contacted by conductor tracks 12, 12'. The interior space of the plastic-material body 13 is filled with a polymer which forms a first insulating layer 24 around the sensor element 11 and around the optoelectronic component 6. The plastic-material body encloses the carrier 8 in FIG. 3 preferably at least to such extent that the first insulating layer 24 which, for example, comprises a liquid or solid polymer, remains in the space inside the plastic-material body 13.

In the shown example, the sensor arrangement comprises an optical sensor such as, for example, a photodiode or a phototransistor. The optoelectronic component 6 is, for example, an LED. The sensor arrangement has, for example, the function of a light barrier.

Although it has only been possible in the examples to describe a limited number of possible developments, this disclosure is not so restricted. It is in principle possible for the sensor arrangement to comprise a number of sensor elements of different types or of the same type and to include further components, wherein the sensor arrangement is of protection class II.

The description of the specified items and the method is not restricted to the individual specific examples. Rather, to the extent that is technically feasible, the features of the individual examples may be combined with one another as desired.

The invention claimed is:

1. A sensor arrangement comprising:
   at least one sensor element with electrical connections and arranged in a solid plastic-material body,
   a first electrically insulating layer which embeds the sensor element, arranged between the sensor element and the plastic-material body, and
   a second electrically insulating layer arranged between the first electrically insulating layer and the plastic-material body,
   wherein the electrical connections extend from the sensor element through an interior space of the plastic-material body and exteriorly of the plastic-material body, and wherein at least all of the electrical connections located inside the plastic material body are surrounded by the first electrically insulating layer.

2. The sensor arrangement according to claim 1, wherein the second electrically insulating layer comprises a polymer.

3. The sensor arrangement according to claim 2, wherein the first electrically insulating layer comprises a flexible or solid polymer.

4. The sensor arrangement according to claim 1, wherein the first electrically insulating layer comprises a polymer.

5. The sensor arrangement according to claim 1, wherein the electrical connections are configured as supply leads comprising a wire or a stranded conductor, wherein the supply leads are configured such that they fix the sensor element at a specific position in the plastic-material body.

6. The sensor arrangement according to claim 1, wherein at least one sensor element functions as a temperature sensor.

7. The sensor arrangement according to claim 6, further comprising at least one optoelectronic component.

8. The sensor arrangement according to claim 1, wherein at least one sensor element functions as an optical sensor.

9. The sensor arrangement according to claim 8, further comprising at least one optoelectronic component.

10. The sensor arrangement according to claim 1, which has an AC voltage endurance of at least 3000 V.

11. The sensor arrangement according to claim 1, wherein the plastic-material body has a material thickness of at least 1 mm.

12. A method for producing a sensor arrangement according to claim 1, wherein a plastic-material body is provided which has a hollow space in which at least one sensor element is positioned.

13. The method according to claim 12, wherein the hollow space between the sensor element and the plastic-material body is filled with a polymer.

14. The method according to claim 12, wherein the hollow space of the plastic-material body is filled with a polymer before positioning of the sensor element.

15. The method according to claim 12, wherein the sensor element is embedded in the first electrically insulating layer before positioning in the hollow space.

16. The method according to claim 15, wherein the intermediate space between the first electrically insulating layer of the sensor element and the plastic-material body is filled with a polymer.

17. A sensor arrangement comprising:
   at least one sensor element with electrical connections and functioning as an optical sensor and arranged in a solid plastic-material body, wherein
   i) at least a first electrically insulating layer which embeds the sensor element, arranged between the sensor element and the plastic-material body, and
   ii) the electrical connections extend from the sensor element through an interior space of the plastic-material body and exteriorly of the plastic-material body, and wherein at least all of the electrical connections located inside the plastic material body are surrounded by the first electrically insulating layer.

18. A sensor arrangement comprising:
   at least one sensor element with electrical connections and functioning as a temperature sensor and arranged in a solid plastic-material body,
   at least one optoelectronic component,
   a first electrically insulating layer which embeds the sensor element arranged between the sensor element and the plastic-material body, and
   a second electrically insulating layer arranged between the first electrically insulating layer and the plastic-material body,
   wherein the electrical connections extend from the sensor element through an interior space of the plastic-material body and exteriorly of the plastic-material body, and
   at least all of the electrical connections located inside the plastic material body are surrounded by the first electrically insulating layer.

19. A sensor arrangement comprising;
   at least one sensor element with electrical connections and arranged in a solid plastic-material body having a hollow space in which at least one sensor element is positioned, wherein i) at least a first electrically insulating layer which embeds the sensor element, arranged between the sensor element and the plastic-material body, ii) the electrical connections extend from the sensor element through an interior space of the plastic-material body and exteriorly of the plastic-material body, and wherein at least all of the electrical connections located inside the plastic material body are surrounded by the first electrically insulating layer, iii) the sensor element is embedded in the first electrically insulating layer before positioning in the hollow space, and iv) the intermediate space between the first electrically insulating layer of the sensor element and the plastic-material body is filled with a polymer.

* * * * *